United States Patent [19] [11] 4,105,846
Hoff et al. [45] Aug. 8, 1978

[54] INCREASING THE PARTICLE SIZE OF AS FORMED POLYETHYLENE OR ETHYLENE COPOLYMER

[75] Inventors: Glen R. Hoff, Naperville, Ill.; Peter Fotis, Jr., Highland, Ind.; David E. Boone, Lisle, Ill.

[73] Assignee: Standard Oil Company (Indiana), Chicago, Ill.

[21] Appl. No.: 827,566

[22] Filed: Aug. 25, 1977

[51] Int. Cl.$^2$ .......................... C08F 4/02; C08F 10/02
[52] U.S. Cl. ............................... 526/124; 252/431 R; 526/352; 526/907
[58] Field of Search ........................................ 526/124

[56] References Cited

U.S. PATENT DOCUMENTS 3,901,863  8/1975  Berger et al. ...................... 526/124

FOREIGN PATENT DOCUMENTS 2,455,415  5/1975  Fed. Rep. of Germany ........... 526/124
2,441,625  3/1975  Fed. Rep. of Germany.
1,309,987  3/1973  United Kingdom ..................... 526/124

Primary Examiner—Edward J. Smith
Attorney, Agent, or Firm—Reed F. Riley; Arthur G. Gilkes; William T. McClain

[57] ABSTRACT

The particle size of as formed polyethylene or ethylene copolymer containing up to about fifteen percent of a $C_3$ to $C_8$ olefin, which is made using a promoted solid catalyst component prepared from a magnesium alkoxide, a titanium (IV) alkoxide and an alkylaluminum dichloride, is increased by adding the dichloride in at least two stages and allowing the preparation mixture to age between stages during the preparation of said catalyst component. The particle size of polymer can be increased substantially using the so treated catalyst component, compared to the particle size of polymer made using untreated catalyst component, when either catalyst component is employed together with an alkylaluminum compound promoter in a slurry or vapor phase process at moderate polymerization temperature and pressure.

8 Claims, No Drawings

INCREASING THE PARTICLE SIZE OF AS FORMED POLYETHYLENE OR ETHYLENE COPOLYMER

SUMMARY OF THE INVENTION

This invention relates to a novel process for increasing the particle size of as formed polyethylene or ethylene dominated copolymer made using high yield catalysts by employing a solid, supported transition-metal-containing, catalyst component together with an alkyl-aluminum compound promoter and, more particularly, it relates to a novel process for increasing the particle size of as formed polyethylene or ethylene dominated copolymer made using a high yield, solid, supported, catalyst component prepared from a magnesium dialkoxide, a titanium (IV) alkoxide and an alkylaluminum dichloride which comprises adding during the preparation of said component said alkylaluminum dichloride in at least two stages with aging between each stage and using the so-treated component together with an aluminum alkyl compound to polymerize ethylene or an ethylene dominated mixture of ethylene and a $C_3$ to $C_8$ olefin to particular polymer.

In accordance with the instant invention, the particle size of as formed polyethylene, or ethylene dominated copolymer with up to about fifteen mol percent of a $C_3$ to $C_8$ olefin, can be increased by a process comprising (a) mixing $Mg(OR)_2$ and $Ti(OR)_4$ wherein R is an alkyl group containing one to about six carbon atoms at elevated temperature; (b) mixing $RAlCl_2$ with the product of (a) in at least two stages, the second stage following the first stage after a period of at least four hours and any subsequent stage following the previous stage by at least two hours; and (c) polymerizing ethylene or a mixture of ethylene and said olefin with a polymerization effective amount of the solid part of (b) and an alkylaluminum compound promoter to form said polyethylene or copolymer in particulate form.

BACKGROUND OF THE INVENTION

Recently, new and highly-active supported titanium catalysts based upon the use of magnesium alkoxides have become available for the commercial production of polyethylene. For example, German Offenlegungsschrift No. 2,123,356 teaches polymerization of ethylene and mixtures thereof with an aluminum alkyl compound co-catalyst and a catalyst component made from a magnesium dialkoxide, a titanium (IV) compound and an aluminum alkyl halide. U.S. Pat. No. 3,901,863 teaches catalyst components made, inter alia, from magnesium and titanium alkoxides and alkylaluminum dichlorides which are promoted with an alkylaluminum compound. Many of these catalysts, however, create serious problems in the particle-form and vapor phase polymerization processes because the particle size of the polymeric product is so fine that difficulties are encountered in the separation and handling of the products; particularly, trouble occurs in the extrusion and compounding steps involved in producing a commercial product. Now a method has been found to keep the high activities of certain of these new generation ethylene polymerization catalysts and yet produce polymer of sufficiently large particle size so that the above-referred to problem is reduced or eliminated completely. The solution to this problem involves a simple variation in the process of manufacture of the solid catalyst component.

STATEMENT OF THE INVENTION

The desirable catalyst component used in the process is a high yield, supported, transition-metal-containing variety made from three components. The first component is a magnesium dialkoxide. Preferably, any lower alkyl, dialkoxide may be employed. More preferably, a dialkoxide having an alkyl radical of from one to about four carbon atoms is used, and, most preferably, magnesium diethoxide is the first component.

The second component is preferably a lower alkyl, titanium (IV) alkoxide. More preferably, it is a lower alkyl, titanium (IV) alkoxide such as titanium tetraethoxide, tetrapropoxide, tetraisopropoxide, tetrabutoxide, tetraisobutoxide, etc.

The third component is preferably a lower alkyl, alkylaluminum dichloride. More preferably, it is an alkylaluminum dichloride in which the alkyl group contains from one to about four carbon atoms. Most preferably, the second component is ethylaluminum dichloride.

The term lower alkyl as used above includes alkyl groups of from one to about six carbon atoms.

The preferred mode of preparation of the catalyst component which gives best results in increasing the particle size of the polymer while maintaining the high polymerization activity is to react in the presence or absence of an inert diluent a magnesium dialkoxide and a titaniumalkoxide and then react the product thereof with the alkylaluminum dichloride.

The relative amount of magnesium dialkoxide and titanium compound used to make up the catalyst component is preferably about one-tenth to three mols of the titanium compound per mol of the magnesium alkoxide used and, more preferably, about one-half to one and one-half mols of titanium compound per mol of the magnesium alkoxide used. The relative amount of alkylaluminum dichloride to be used in the catalyst component preparation is about two-tenths to ten mols of alkylaluminum dichloride per total mols of alkoxide used. More preferably, this ratio varies between about one-half to five mols of alkylaluminum dichloride per total mols of alkoxide used.

The reaction step involved in mixing the magnesium and titanium alkoxides is carried out preferably by heating at elevated temperature in the temperature range from above ambient to about 140° C. and, more preferably, in the range of from above about 30° C to about 100° C. Generally, reaction involving the $RAlCl_2$ compound is carried out above about $-20°$ C. More preferably, the reaction with ethylaluminum dichloride is carried out above about $+20°$ C. The temperature however should not be much above about 60° C.

It is preferred to carry out reaction with the alkylaluminum dichloride by treating the reactants in an inert, liquid diluent. However, the titanium and magnesium compounds are preferably reacted neat. By inert liquid diluent is meant a diluent which at least partially dissolves te reactants and is substantially unreactive with such reactants at the reaction temperature. Hydrocarbons, aromatic or aliphatic, such as benzene or heptane and their halo derivatives are excellent for this purpose if they can be conveniently handled at the reaction temperature. Aliphatic hydrocarbons are preferred. It is important, for best results, that the inert liquid diluent chosen is purified prior to use from traces of moisture, oxygen, etc. and traces of polar organic substances by, for example, percolating the diluent through silica gel or molecular sieves.

Preferably, each reaction step is allowed to continue about thirty minutes to about 48 hours and, more preferably, about two hours to about 24 hours.

The alkylaluminum compound is added, preferably below ambient temperature as set forth above in at least two stages with the amount added conveniently being about the same in each stage. Two stages are preferred while more than about four do not further improve the catalyst component.

The aging period between the first two stages is about four hours to about 24 hours with about 4 to 8 hours being preferred. Subsequent stages are separated by at least 2 hour aging periods with about 3 to 6 hour periods being preferred.

The amount of titanium compound combined in the support material after the above combining is relatively small being in the range of about one to about twenty weight percent of the support weight calculated as the metal. More preferably, it is between about two to about fifteen weight percent. Other things being equal, the more titanium compound combined with the support material, the more active the supported catalyst becomes. Too much, however, can be wasteful of the titanium or vanadium compound and also can lead to decreased yields.

Use of the treated catalyst component for the polymerization of olefins is accompanied for best results by the use of a promoter which is usefully an alkylaluminum compound. More preferably, it is a lower alkyl, trialkylaluminum, dialkylaluminum hydride or dialkylaluminum chloride and, most preferably, a lower alkyl, trialkylaluminum is the substance used. By lower alkyl is meant an alkyl group containing between one and about six carbon atoms.

For particle form polymerizations the total amount of organoaluminum used depends upon whether the organoaluminum is mixed with the polymerization diluent, if used, as well as the treated catalyst component. For preferable results employing a process using a diluent, the ratio of total millimols of organoaluminum used to grams of supported catalyst should be at least about two to one. More preferably, it is at least about ten to one and, most preferably, it is at least about twenty-five to one. This ratio depends upon polymerization temperature somewhat, increasing as polymerization temperature decreases and also upon solvent purity and the amount of solvent used. For vapor phase polymerization the amount of alkylaluminum compound required is substantially less.

The treated catalyst component described above may be used in the particle form variation in the temperature range from above about ambient to about 130° C. The treated catalyst component may be used also in an essentially solventless process wherein the olefin is polymerized directly from the vapor phase. The polymerization temperature using the essentially solventless process should be large enough to give an adequate polymerization rate but not too large to raise the pressure above that which is normally used in this type of process, i.e., several hundred p.s.i.g. or soften the polymer bed upon which polymerization takes place.

In the particle form process, the polymerization is carried out at a temperature such that the polymer as formed is a solid in the polymerization reactor. The preferred polymerization temperature is about 40° C. to about 120° C. Vapor state polymerization wherein supported catalyst component, alkylaluminum compound, monomer and quench liquid, if used, are important components, the preferable temperature range is from about ambient to about 130° C. and, more preferably, about 40° C. to about 120° C.

Whereas the preferred olefin to be polymerized is ethylene, it is found that the treated catalyst component is also useful to increase the as formed particle size of ethylene copolymers containing up to about fifteen mol percent of a second olefin like propene, 1-butene or 1-pentene or a polymerizable diolefin such as butadiene or isoprene.

It is of particular importance, for best results, that the olefin, for example ethylene, be substantially free of catalyst poisons. Thus, it is preferred to use polymerization grade ethylene and to pass it through a molecular sieve prior to use to remove the remaining traces of moisture, oxygen, carbon dioxide and polar organic compounds.

The polymerization diluent employed in a particle form process can be an aliphatic alkane or cycloalkane such as isobutane, pentane, hexane, heptane or cyclohexane or a hydrogenated aromatic compound such as tetrahydronaphthalene or decahydronaphthalene or a high molecular weight liquid paraffin or mixture of paraffins which are liquid at the reaction temperature. The nature of the diluent is subject to considerable variation, although the diluent employed should be liquid under the conditions of polymerization and relatively inert. For vapor phase polymerizations, isobutane, pentane or hexane are useful for temperature control.

The polymerization diluent employed in practicing this invention should be purified, for best results, from traces of moisture, oxygen, carbon dioxide and polar organic compounds prior to use in the polymerization reaction by contacting the diluent for example, in a distillation procedure or otherwise, with an organoaluminum compound prior to or after percolating the solvent through silica gel or molecular sieves.

The polymerization time is not critical and will usually be of the order of thirty minutes to several hours in batch processes. Contact times of from one to several hours are commonly employed in autoclave type reactions. When a continuous process is employed, the contact time in the polymerization zone can also be regulated as desired, and in some cases it is not necessary to employ reaction or contact times much beyond one-half to several hours since a cyclic system can be employed by removal of the polymer and return of the diluent, if used, and unreacted monomer to the charging zone where the catalyst can be replenished and additional monomer introduced.

The treated polymerization catalyst component of this invention is normally used with an additive to control molecular weight such as hydrogen. Solid polymers having molecular weights greater than about 50,000 and less than about 2,000,000 result thereby. The amount of hydrogen to be used depends upon the molecular weight distillation to be obtained and is well known to those skilled in the art.

The polyolefins prepared in accordance with this invention can be extruded, mechanically melted, cast or molded as desired. They can be used to form plates, sheets, films or a variety of molded objects.

Usefully, the pressure range for the polymerization process using the treated catalyst component is about atmospheric to over 1000 p.s.i.g. More preferably, the pressure range varies from about 100 p.s.i.g. to about 800 p.s.i.g. and, most preferably, the pressure range used in the instant process is about 200 p.s.i.g. to about 700 p.s.i.g.

The polymerization conditions useful in employing the treated catalyst component of the instant invention are generally those well known to those skilled in the art.

While the invention is described in connection with the specific Examples below, it is to be understood that these are for illustrative purposes only. Many alternatives, modifications and variations will be apparent to those skilled in the art in the light of the below Examples and such alternatives, modifications and variations fall within the scope and spirit of the appended claims.

GENERAL EXPERIMENTAL PROCEDURE

The magnesium ethoxide used was a commercial product from Alfa Products. The aluminum alkyl compounds were approximately 25 weight percent in heptane and were purchased from Texas Alkyls. The titanium tetrachloride was purchased from Matheson, Coleman and Bell and 99.5% by analysis. Melt indices were run using the method given in ASTM D 1238. Sieving was accomplished by putting ten grams of the polymer on the appropriate mesh size screen and gently shaking for five minutes.

EXAMPLE I

A mixture of 14.2 g $Mg(OC_2H_5)_2$ and 17 ml $Ti(OC_4H_9)_4$ in 25 ml nonane was heated to the reflux temperature of nonane for 22 hours. The mixture was then cooled to 100° C, 125 ml hexane was added to further cool and dilute the metal alcoholate solution. After the mixture was cooled to room temperature, it was centrifuged to remove the solid material and 125 ml of a 25% solution of ethylaluminum dichloride in hexane was slowly added at room temperature over a ninety minute period. The mixture was then allowed to age overnight at room temperature and 250 ml of the 25% ethylaluminum dichloride was added. The mixture was then refluxed one hour. The resulting slurry was decanted and fresh hexane added to make a stock slurry of catalyst component.

EXAMPLE II

A mixture of 114 g $Mg(OC_2H_5)_2$, 136 ml $Ti(OC_4H_9)_4$ and 100 ml nonane was heated at the reflux temperature of nonane for 19 hours. One liter of hexane was then added, followed by 1 liter of a 25% solution of ethylaluminum dichloride in hexane added at 25°–45° C over a two-hour period. After the mixture had aged 17 hours, another 2.2 liters of ethylaluminum dichloride solution was added at room temperature over a three-hour period. The mixture was then heated at the reflux temperature of the hexane for one hour. The resulting slurry was decanted and fresh hexane added to make a stock slurry of catalyst component.

EXAMPLE III

Example II was repeated except that the entire amount of ethylaluminum chloride was added together.

EXAMPLE IV

A mixture of 2.2 mg of the catalyst component of Example II and 42 mg $Al(C_2H_5)_3$ were stirred in 261 ml hexane contained in a stirred reactor. Ninety pounds of hydrogen and sufficient ethylene to maintain the reactor pressure at 300 lbs were employed for the polymerization. In one hour at 180° F, 81.1 g polyethylene was formed of which only eight percent passed through a 70-mesh sieve. The catalyst component of Example III employed under similar conditions gave 60.6 g of polyethylene of which 74.6% passed through a 70-mesh screen.

EXAMPLE V

Polymerization was carried out in a horizontal gas phase unit with polymer particulate being removed from the reactor bed for testing. The results are given in the Table below.

| Catalyst Component | Hydrogen Mol % | Temp. | Yield | Melt Index | % Through 70 Mesh |
|---|---|---|---|---|---|
| I | 43 | 180° F | 50,000 | 0.51 | 17 |
| I | 49.5 | 180° F | 20,000 | 3.0 | 14 |
| III | 36 | 180° F | 91,000 | 0.40 | 65 |

A mixture of 7.2 g $Mg(OC_2H_5)_2$, 8.6 ml $Ti(OC_4H_9)_4$, and 25 ml nonane was heated 18 hours at the reflux temperature of the nonane. The mixture was then cooled to 90° C, 125 ml hexane added carefully, and the solution further cooled to 0° C while being stirred. A dilute solution of ethylaluminum dichloride (200 ml, containing 40 g $Al(C_2H_5)Cl_2$) was added over a period of 1¼ hours. The catalyst was then allowed to warm to room temperature over a 4.5 hour period. The resulting slurry was decanted and hexane added to make a stock slurry of catalyst component.

EXAMPLE VII

A mixture of 117 g $Mg(OC_2H_5)_2$, 140 ml $Ti(OC_4H_9)_4$, and 100 ml nonane were heated 10 hours at the reflux temperature of nonane, cooled to 90° C and 750 ml hexane slowly added. The mixture was cooled to −10° C and a dilute solution of ethylaluminum dichloride (3.25 l containing 647 g $Al(C_2H_5)Cl_2$) was added to the cold, stirred metal alcoholate solution over a period of 4.5 hours. The reaction mixture was allowed to warm to room temperature overnight, decanted and hexane added to make a stock slurry of catalyst component.

EXAMPLE VIII

Example VI was repeated except that the ethylaluminum dichloride was added at ambient temperature.

EXAMPLE IX

A mixture of 2.2 mg the catalyst component of Example VI and 42 mg $Al(C_2H_5)_3$ was placed in 261 ml hexane in a stirred reactor. Seventy pounds of hydrogen and sufficient ethylene to maintain the pressure at 300 lbs were employed at 180° F for the polymerization. After one hour 84 g of polyethylene was formed of which only eleven percent passed through a 70-mesh screen. Under similar polymerization conditions the catalyst component of Example VIII gave 60.6 g of polyethylene of which 74.6% passed through a 70-mesh screen.

What is claimed is:

1. A process for increasing the particle size of as formed polyethylene or copolymers thereof with up to fifteen mol percent of a $C_3$ to $C_8$ olefin comprising:
   (a) Mixing $Mg(OR)_2$ and $Ti(OR)_4$, wherein R is an alkyl group containing between one and about six carbon atoms at elevated temperature;

(b) mixing RAlCl$_2$ in the presence of an inert diluent above about −20° C with the product of (a) in at least two stages, the second stage following the first stage after an aging period of at least four hours and any subsequent stage following the previous stage by at least two hours; and (c) polymerizing ethylene or a mixture of ethylene and said olefin with a polymerization effective amount of the solid part of the product of (b) and an alkylaluminum compound promoter to form said polyethylene or copolymer thereof in particulate form.

2. The process of claim 1 wherein said RAlCl$_2$ is mixed with the product of (a) at a temperature above about 20° C.

3. The process of claim 1 wherein R is an ethyl group in Mg(OR)$_2$ and a butyl group in Ti(OR)$_4$.

4. The process of claim 2 wherein R is an ethyl group in Mg(OR)$_2$ and a butyl group in Ti(OR)$_4$.

5. The process of claim 3 wherein said alkylaluminum compound is a lower alkyl trialkylaluminum.

6. The process of claim 4 wherein said alkylaluminum compound is a lower alkyl trialkylaluminum.

7. The process of claim 5 wherein said trialkylaluminum compound is triethylaluminum.

8. The process of claim 6 wherein said trialkylaluminum compound is triethylaluminum.

UNITED STATES PATENT OFFICE
CERTIFICATE OF CORRECTION

Patent No. 4,105,846            Dated August 8, 1978

Inventor(s) Hoff, Glen R.; Fotis, Peter, Jr.; & Boone, David E.

It is certified that error appears in the above-identified patent and that said Letters Patent are hereby corrected as shown below:

Col. 1, Line 24 - "particular" should be "particulate."

Col. 4, Line 60 - "distillation" should be "distribution."

Col. 5, Line 23 - "and 99.5%" should be "and was 99.5%."

Col. 6, Line 18 - "I" should be "II."

Signed and Sealed this

Sixth Day of March 1979

[SEAL]

*Attest:*

RUTH C. MASON
*Attesting Officer*

DONALD W. BANNER
*Commissioner of Patents and Trademarks*